United States Patent
Scherer et al.

(10) Patent No.: US 6,391,996 B1
(45) Date of Patent: May 21, 2002

(54) COPOLYMERS OBTAINABLE BY THE ATRP METHOD AND A METHOD FOR THEIR PREPARATION AND THEIR USE

(75) Inventors: Markus Scherer, Lebach (DE); Joan Souchik, Blue Bell, PA (US)

(73) Assignee: RohMax Additives GmbH, Darmstadt (DE)

( * ) Notice: Subject to any disclaimer, the term of this patent is extended or adjusted under 35 U.S.C. 154(b) by 0 days.

(21) Appl. No.: 09/450,745

(22) Filed: Nov. 30, 1999

(51) Int. Cl.$^7$ .................................................. C08F 20/10

(52) U.S. Cl. ................................ 526/323.1; 526/318.2; 526/318; 526/317.1; 526/319; 526/329.7

(58) Field of Search .............................. 526/318.2, 318, 526/317.1, 319, 323.1, 329.7

(56) References Cited

U.S. PATENT DOCUMENTS 5,368,761 A   11/1994   Gore et al.

FOREIGN PATENT DOCUMENTS

| EP | 153209 | 8/1985 |
|---|---|---|
| EP | 0 236 844 | 9/1987 |
| WO | WO 96/30421 | 10/1996 |
| WO | WO 9718247 | 5/1997 |
| WO | WO 9734940 | 9/1997 |
| WO | WO 98/40415 | 9/1998 |

*Primary Examiner*—David W. Wu
*Assistant Examiner*—William K Cheung
(74) *Attorney, Agent, or Firm*—Oblon, Spivak, McClelland, Maier & Neustadt, P.C.

(57) ABSTRACT

This invention concerns copolymers, which are obtainable by ATRP methods, where a mixture of ethylenically unsaturated monomers consisting of a) 0 to 40% by weight of one or more ethylenically unsaturated ester compounds of formula (I)

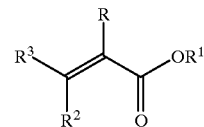

(I)

where R is hydrogen or methyl, $R^1$ means a linear or branched alkyl residue with 1 to 5 carbon atoms, $R^2$ and $R^3$ independently represent hydrogen or a group of the formula —COOR', where R' means hydrogen or an alkyl group with 1 to 5 carbon atoms, b) 10 to 98% by weight of one or more ethylenically unsaturated ester compounds of formula (II)

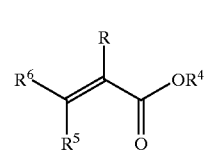

(II)

where R is hydrogen or methyl, $R^4$ means a linear or branched alkyl residue with 6 to 15 carbon atoms, $R^5$ and $R^6$ independently are hydrogen or a group of the formula —COOR", where R" means hydrogen or an alkyl group with 6 to 15 carbon atoms, c) 0 to 80% by weight of one or more ethylenically unsaturated ester compounds of formula (III)

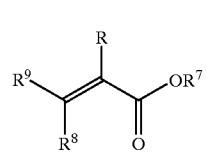

(III)

where R is hydrogen or methyl, $R^7$ means a linear or branched alkyl residue with 16 to 30 carbon atoms, $R^8$ and $R^9$ independently are hydrogen or a group of the formula —COOR'" where R'" means hydrogen or an alkyl group with 16 to 30 carbon atoms, d) 0 to 50% by weight comonomer, where the indication of % by weight in each case refers to the total weight of the ethylenically unsaturated monomers.

The new copolymers are used as pour point depressants.

15 Claims, No Drawings

COPOLYMERS OBTAINABLE BY THE ATRP METHOD AND A METHOD FOR THEIR PREPARATION AND THEIR USE

This invention concerns copolymers that can be obtained by the ATRP method and concentrates and lubricant oils that contain these copolymers, a method for preparation of these copolymers as well as their use as pour point depressants.

Lubricants, especially mineral oils obtained from petroleum by distillation, for example, contain as a rule long-chain n-alkanes, which on the one hand bring about good viscosity/temperature, but on the other hand precipitate out in crystalline form upon cooling and in this way have an adverse effect on the flow of the oil or completely prevent ("plug") it. An improvement of low temperature flow properties can be achieved, for example, by dewaxing. However, costs rise considerably if complete dewaxing is supposed to be achieved. For this reason a pour point range down −15° C. is achieved by partial dewaxing, and this pour point can be further lowered by the addition of the so called pour point depressants or pour point improvers. These agents can effectively reduce the pour point even in concentrations of 0.01 to 1% by weight.

However, the mode of action of these compounds has not yet been completely clarified. In any case it is assumed that paraffin-like compounds become incorporated into the growing paraffin crystal surfaces and so stop further crystallization and in particular the formation of extended crystal structures.

Certain structural elements are known to have pour point depressant activity. In particular, polymers with sufficiently long alkyl side chains exhibit a pour point and flow improving effect. Here it is assumed that these alkyl groups become incorporated into the growing paraffin crystals and disrupt crystal growth (see Ullmann's Encyclopedia of Industrial Chemistry, 4$^{th}$ Edition, Vol. 20, Verlag Chemie, 1981, p. 548). On top of that, it is required of industrially usable pour point depressants that they have good thermal, oxidative and chemical stability, shear strength, etc. Moreover, it should be possible to produce the pour point and flow improvers on a cost favorable basis, since they are used in large quantities.

Polymethacrylates with long chain alkyl residues are used to a wide extent as pour point depressants or flow improvers. These compounds are described, for example, in U.S. Pat. Nos. 2,091,627, 2,100,993, 2,114,233 and EP-A-0 236 844. In general, these pour point depressants are produced by radical polymerization. Accordingly, they can be produced on a cost favorable basis. Their low temperature properties, which follow for example from the pour points in accordance with ASTM D-97, the minirotary viscosimetry test values in accordance with ASTM D-4684 or the scanning Brookfield results in accordance with ASTM D-5133, are usable for many applications, but all the same the low temperature properties are still not sufficient for many application.

Here one should take into account that more effective additives could be added in a smaller quantity in order to achieve a desired flow property at low temperatures. With the amounts of lubricants and diesel biofuels that are used there would be a considerable potential for savings even with relatively small differences.

Taking into consideration the prior art, it is now a task of this invention to make available additives through which improved flow properties of lubricants and diesel biofuels at low temperatures can be achieved, compared to the traditional additives. In addition, a task of the invention was to make available additives that have high stability with respect to oxidation and thermal stress as well as high shear strength. At the same time, the new additives are supposed to be produceable in a simple and economical way.

These as well as other not explicitly mentioned tasks, which, however, can easily be derived or developed from the introductory material, are solved by a polymer with all of the characteristics of claim 1. Expedient modifications of the copolymers in accordance with the invention are provided protection in the claims that refer back to claim 1. With regard to the concentrate as lubricant additive, claim 4 provides the solution of the underlying task, while claims 6 and 9 protect lubricants or diesel biofuels that contain the polymers in accordance with the invention. Claims 11 and 14 represent a solution of the problem with respect to the method for preparation of copolymers and their use.

Copolymers that have high efficiency as pour point depressants or flow improvers are obtained by the fact that ethylenically unsaturated monomers are polymerized by means of initiators that have a transferable atomic group, and one or more catalysts that contain at least one transition metal, in the presence of ligands that can form a coordination compound with the metallic catalyst(s), where the mixture of ethylenically unsaturated monomers consists of a) 0 to 40% by weight of one or more ethylenically unsaturated ester compounds of formula (I)

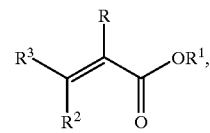

(I)

where R is hydrogen or methyl, $R^1$ means a linear or branched alkyl residue with 1 to 5 carbon atoms, $R^2$ and $R^3$ independently represent hydrogen or a group of the formula —COOR', where R' means hydrogen or a alkyl group with 1 to 5 carbon atoms, b) 10 to 98% by weight of one or more ethylenically unsaturated ester compounds of formula (II)

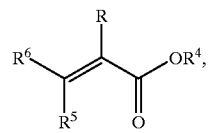

(II)

where R is hydrogen or methyl, $R^4$ means a linear or branched alkyl residue with 6 to 15 carbon atoms, $R^5$ and $R^6$ independently are hydrogen or a group of the formula —COOR", where R" means hydrogen or an alkyl group with 6 to 15 carbon atoms, c) 0 to 80% by weight of one or more ethylenically unsaturated ester compounds of formula (III)

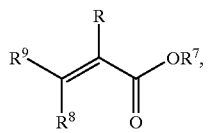

(III)

where R is hydrogen or methyl, $R^7$ means a linear or branched alkyl residue with 16 to 30 carbon atoms, $R^8$ and $R^9$ independently are hydrogen or a group of the formula —COOR''' where R''' means hydrogen or an alkyl group with 16 to 30 carbon atoms, d) 0 to 50% by weight comonomer, where the data in % by weight refer in each case to the total weight of the ethylenically unsaturated monomers. The pour point depressant effect can be determined, for example, in accordance with ASTM D 97.

Moreover, lubricants that contain the copolymers in accordance with the invention produce excellent minirotary viscosmetry values (MRV), which can be produced in accordance with ASTM D 4684, and scanning Brookfield results, as are obtained in accordance with ASTM D 5133.

Diesel biofuels, which contains copolymers of the present invention, exhibit exceptional results in cold filter plugging point measurements by IP 309 or low temperature flow tests in accordance with ASTM D 4539.

If certain flow properties at a given temperature are supposed to be achieved, the amount of additive can be reduced through this invention.

At the same time a number of other advantages can be achieved through the copolymers in accordance with the invention. Among these are:

The copolymers of this invention are characterized by a narrow molecular weight distribution. A high stability toward shearing effects is achieved through this.

The copolymers in accordance with the invention can be produced on a cost favorable basis.

The copolymers exhibit high resistance to oxidation and are chemically very stable.

Copolymers are substantially known; they are polymers that are obtained by polymerization of two or more different monomers. This term is to be understood broadly, so that statistical copolymers, block copolymers which contain two, three or more blocks, graft copolymers and gradient polymers are included in it.

The compositions from which the copolymers in accordance with the invention contain, in particular, (meth) acrylates, maleates and fumarates that have different alcohol residues. The term (meth)acrylates includes methacrylates and acrylates as well as mixtures of the two. These monomers are to a large extent known. Here the alkyl residue can be linear, cyclic or branched.

Mixtures from which the copolymers in accordance with the invention can be obtained can contain 0 to 40% by weight, especially 0.5 to 20% by weight of one or more ethylenically unsaturated ester compounds of formula (I)

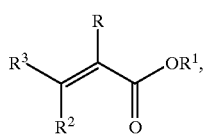

(I)

where R is hydrogen or methyl, $R^1$ means a linear or branched alkyl residue with 1 to 5 carbon atoms, $R^2$ and $R^3$ are independently hydrogen or a group of the formula —COOR', where R' means hydrogen or an alkyl group with 1 to 5 carbon atoms.

Examples of component (a) are, among others, (meth) acrylates, fumarates and maleates, which derived from saturated alcohols such as methyl (meth)acrylate, ethyl (meth) acrylate, n-propyl (meth)acrylate, isopropyl (meth)acrylate, n-butyl (meth)acrylate, tert-butyl (meth)acrylate and pentyl (meth)acrylate; cycloalkyl (meth)acrylates, like cyclopentyl (meth)acrylate; (meth)acrylates that derive from unsaturated alcohols like 2-propynyl (meth)acrylate, allyl (meth)acrylate and vinyl (meth)acrylate.

As an important component, the composition to be polymerized contains 10 to 98% by weight, especially 20 to 95% by weight of one or more ethylenically unsaturated ester compounds of formula (II)

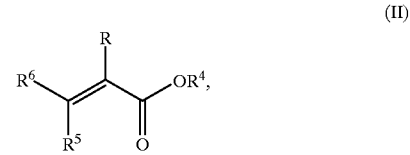

(II)

where R is hydrogen or methyl, $R^4$ means a linear or branched alkyl residue with 6 to 15 carbon atoms, $R^5$ and $R^6$ are independently hydrogen or a group of the formula —COOR'', where R'' means hydrogen or an alkyl group with 6 to 15 carbon atoms.

Among these are (meth)acrylates, fumarates and maleates, that derive from saturated alcohols, such as hexyl (meth)acrylate, 2-ethylhexyl (meth)acrylate, heptyl (meth) acrylate, 2-tert-butylheptyl (meth)acrylate, octyl (meth) acrylate, 3-isopropylheptyl (meth)acrylate, nonyl (meth) acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate; (meth)acrylates that derive from unsaturated alcohols such as oleyl (meth)acrylate; cycloalkyl (meth)acrylates such as 3-vinylcyclohexyl (meth) acrylate, cyclohexyl (meth)acrylate, bornyl (meth)acrylate; and the corresponding fumarates and maleates.

Moreover, the monomer mixtures to be used can contain 0 to 80% by weight, preferably 0.5 to 60% by weight of one or more ethylenically unsaturated ester compounds of formula (III)

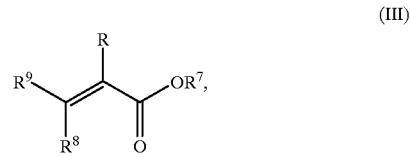

(III)

where R is hydrogen or methyl, $R^7$ means a linear or branched alkyl residue with 16 to 30 carbon atoms, $R^8$ and $R^9$ are independently hydrogen or a group of the formula —COOR''', where R''' means hydrogen or an alkyl group with 16 to 30 carbon atoms.

Example of component (c) are, among others, (meth) acrylates that derive from saturated alcohols such as hexadecyl (meth)acrylate, 2-methylhexadecyl (meth)acrylate, heptadecyl (meth)acrylate, 5-isopropylheptadecyl (meth) acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth) acrylate, eicosyl (meth)acrylate, cetyleicosyl (meth)acrylate, stearyleicosyl (meth)acrylate, docosyl (meth)acrylate, and/ or eicosyltetratriacontyl (meth)acrylate; cycloalkyl (meth) acrylates such as 2,4,5-tri-t-butyl-3-vinylcyclohexyl (meth) acrylate, 2,3,4,5-tetra-t-butylcyclohexyl (meth)acrylate; oxiranyl methacrylates such as 10,11-epoxyhexadecyl methacrylate; as well as the corresponding fumarates and maleates.

The ester compounds with a long-chain alcohol residue, especially components (b) and (c) can be obtained, for example, by reacting (meth)acrylates, fumarates, maleates and/or the corresponding acids with long chain fatty alcohols, where in general a mixture of esters such as (meth)acrylates with different long chain alcohol residues results. These fatty alcohols include, among others, Oxo Alcohol® 7911 and Oxo Alcohol® 7900, Oxo Alcohol® 1100 (Monsanto); Alphanol® 79 (ICI); Nafol® 1620, Alfol® 610 and Alfol® 810 (Condea); Epal® 610 Epal® 810 (Ethyl Corporation); Linevol® 79, Linevol® 911 and Dobanol® 25L (Shell AG); Lial 125 (Augusta® Mailand); Dehydad® and Lorol® (Henkel KGaA) and Linopol® 7–11 and Acropol® 91 (Ugine Kuhlmann).

Of the ethylenically unsaturated ester compounds the (meth)acrylates are particularly preferred over the maleates and fumarates, i.e., $R^2$, $R^3$, $R^5$, $R^6$, $R^8$, $R^9$ of formulas (I), (II) and (III) represent hydrogen in particularly preferred embodiments.

Component (d) comprises in particular ethylenically unsaturated monomers that can copolymerize with the ethylenically unsaturated ester compounds of formula (I), (II) and/or (III).

However, comonomers that correspond to the following formula are especially suitable for polymerization in accordance with the invention:

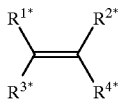

where $R^{1*}$ and $R^{2*}$ independently are selected from the group consisting of hydrogen, halogens, CN, linear or branched alkyl groups with 1 to 20, preferably 1 to 6 and especially preferably 1 to 4 carbon atoms, which can be substituted with 1 to (2n+1) halogen atoms, where n is the number of carbon atoms of the alkyl group (for example $CF_3$), α,β-unsaturated linear or branched alkenyl or alkynyl groups with 2 to 10, preferably 2 to 6 and especially preferably 2 to 4 carbon atoms, which can be substituted with 1 to (2n−1) halogen atoms, preferably chlorine, where n is the number of carbon atoms of the alkyl group, for example $CH_2=CCl—$, cycloalkyl groups with 3 to 8 carbon atoms, which can be substituted with 1 to (2n−1) halogen atoms, preferably chlorine, where n is the number of carbon atoms of the cycloalkyl group; $C(=Y^*)R^{5*}$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}$ $SO_2R^{5*}$, $PR^{5*}_2$, $P(=Y^*)R^{5*}_2$, $Y^*PR^{5*}_2$, $Y^*P(=Y^*)R^5_2$, $NR^{8*}_2$, which can be quaternized with an additional $R^{8*}$, aryl, or heterocyclyl group, where $Y^*$ can be $NR^{8*}$, S or O, preferably O; $R^{5*}$ is an alkyl group with 1 to 20 carbon atoms, an alkylthio group with 1 to 20 carbon atoms, $OR^{15}$ ($R^{15}$ is hydrogen or an alkali metal), alkoxy with 1 to 20 carbon atoms, aryloxy or heterocyclyloxy; $R^{6*}$ and $R^{7*}$ independently are hydrogen or an alkyl group with 1 to 20 carbon atoms, or $R^{6*}$ and $R^{7*}$ together can form an alkylene group with 2 to 7, preferably 2 to 5 carbon atoms, where they form a 3 to 8 member, preferably 3 to 6 member ring, and $R^{8*}$ is hydrogen linear or branched alkyl or aryl groups with 1 to 20 carbon atoms;

$R^{3*}$ and $R^{4*}$ independently are chosen from the group consisting of hydrogen, halogen (preferably fluorine or chlorine), alkyl groups with 1 to 6 carbon atoms and $COOR^{9*}$, where $R^{9*}$ is hydrogen, an alkali metal or an alkyl group with 1 to 40 carbon atoms, or $R^{1*}$ and $R^{3*}$ can together form a group of the formula $(CH_2)_{n'}$; which can be substituted with 1 to 2n' halogen atoms or $C_1$ to $C_4$ alkyl groups, or can form a group of the formula $C(=O)—Y^*—C(=O)$, where n' is from 2 to 6, preferably 3 or 4, and $Y^*$ is defined as before; and where at least 2 of the residues $R^{1*}$ $R^{2*}$, $R^{3*}$ and $R^{4*}$ are hydrogen or halogen.

These include, among others, hydroxyalkyl (meth)acrylates like 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate;

aminoalkyl (meth)acrylates like N-(3-dimethylaminopropyl)methacrylamide, 3-diethylaminopentyl methacrylate, 3-dibutylaminohexadecyl (meth)acrylate;

nitriles of (meth)acrylic acid and other nitrogen-containing methacrylates like N-(methacryloyloxyethyl)diisobutylketimine, N-(methacryloyloxyethyl)dihexadecylketimine, methacryloylamidoacetonitrile, 2-methacryloyloxyethylmethylcyanamide, cyanomethyl methacrylate;

aryl (meth)acrylates like benzyl methacrylate or phenyl methacrylate, where the acryl residue in each case can be unsubstituted or substituted up to four times;

carbonyl-containing methacrylates like 2-carboxyethyl methacrylate, carboxymethyl methacrylate, oxazolidinylethyl methacrylate, N-(methacryloyloxy) formamide, acetonyl methacrylate, N-methacryloylmorpholine, N-methacryloyl-2-pyrrolidinone, N-(2-methyacryloxyoxyethyl)-2-pyrrolidinone, N-(3-methacryloyloxypropyl)-2-pyrrolidinone, N-(2-methyacryloyloxypentadecyl)-2-pyrrolidinone, N-(3-methacryloyloxyheptadecyl)-2-pyrrolidinone;

glycol dimethacrylates, like 1,4-butanediol methacrylate, 2-butoxyethyl methacrylate, 2-ethoxyethoxymethyl methacrylate, 2-ethoxyethyl methacrylate;

methacrylates of ether alcohols like tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate;

methacrylates of halogenated alcohols, like 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate;

oxiranyl methacrylate like 2,3-epoxybutyl methacrylate, 3,4-epoxybutyl methacrylate, 10,11 epoxyundecyl methacrylate, 2,3-epoxycyclohexyl methacrylate; glycidyl methacrylate;

phosphorus-, boron- and/or silicon-containing methacrylates like 2-(dimethylphosphato)propyl methacrylate, 2-(ethylphosphito)propyl methacrylate, dimethylphosphinomethyl methacrylate, dimethylphosphonoethyl methacrylate, diethylmethacryloyl phosphonate, dipropylmethacryloyl phosphate, 2-(dibutylphosphono)ethyl methacrylate, 2,3-butylenemethacryloylethyl borate, methyldiethoxymethacryloylethoxysiliane, diethylphosphatoethyl methacrylate;

sulfur-containing methacrylates like ethylsulfinylethyl methacrylate, 4-thiocyanatobutyl methacrylate, ethylsulfonylethyl methacrylate, thiocyanatomethyl methacrylate, methylsulfinylmethyl methacrylate, bis(methacryloyloxyethyl) sulfide;

trimethacrylates like trimethyloylpropane trimethacrylate;

vinylhalides such as vinyl chloride, vinyl fluoride, vinylidene chloride and vinylidene fluoride;

heterocyclic (meth)acrylates like 2-(1-imidazolyl)ethyl (meth)acrylate, 2-(4-morpholinyl)ethyl (meth)acrylate and 1-(2-methacryloyloxyethyl)-2-pyrrolidone;

vinyl esters like vinyl acetate;

styrene, substituted styrenes with an alkyl substituent in the side chain, such as α-methylstyrene and α-ethylstyrene, substituted styrenes with an alkyl substituent on the ring such as vinyl toluene and p-methylstyrene, halogenated styrenes such as monochlorostyrenes, dichlorostyrenes, tribromostyrenes and tetrabromostyrenes;

heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid and maleic acid derivatives such as mono- and diesters of maleic acid, maleic anhydride, methylmaleic anhydride, maleinimide, methylmaleinimide;

fumaric acid and fumaric acid derivatives such as mono- and diesters of fumaric acid;

dienes such as divinyl benzene.

Really especially preferred mixtures contain methyl methacrylate, butyl methacrylate, lauryl methacrylate, stearyl methacrylate and/or styrene.

The components can be used individually or as mixtures. However, a requirement is that at least two different monomers are polymerized.

These components can be added to a reaction mixture at the same time or sequentially in order to obtain copolymers in accordance with the invention. Statistical copolymers, gradient copolymers, graft copolymers and block copolymers result, in each case according to the, type of addition.

A large number of mixtures, which all contain monomers that are to be polymerized, can be used to obtain statistical copolymers. Also, continuous or batchwise mixtures of monomer mixtures is conceivable, where their compositions are in general kept constant over the period of the addition in order to insure a statistical distribution of the individual structural units in the copolymer.

Besides statistical copolymers, gradient and block copolymers can be obtained by the method of this invention by varying the composition of the monomers, thus the relative concentration of the different monomers to each other during the polymerization.

Block copolymers can be obtained by adding different monomers or mixtures of monomers batchwise to the reaction mixture. In doing so, one should take into account the living character of the ATRP method, so that the reaction between the addition of the different monomers or mixtures of monomers can be interrupted over a longer time. A similar result can also be achieved by abruptly changing the compositions of the monomers at certain time points in the continuous addition of them.

Gradient copolymers are copolymers, for example of 2 monomers A and B, in whose individual chains a gradient of the distribution of the monomer structural units exists along the chain. Thus, one chain end is rich in A structural units and the other is rich in B structural units. These polymers are easily prepared by ATRP methods, since they have a living character. Thus, gradient copolymers can be obtained by continuous variation of the monomer mixture that is added during polymerization. Preferably here the monomers that vary over the individual chains. are added to the reaction mixture via different inlets.

The previously mentioned monomers are polymerized by means of initiators that have a transferable atomic group. In general, these initiators can be described by the formula Y—(X)$_m$, where Y represents the case molecule, of which it is assumed that it forms radicals, X represents a transferable atom or a transferable atomic group and m is a whole number in the range of 1 to 10, depending on the functionality of group Y. If m>1, the various transferable atomic groups X can have differing importance. If the functionality of the initiator is >2, star polymers are obtained. Preferred transferable atoms or atomic groups are halogens such as Cl, Br and/or I.

As previously mentioned, it is assumed of group Y that it forms radicals, which serve as the starting molecule, where this radical adds to the ethylenically unsaturated monomers. For this reason group Y preferably has substituents that can stabilize radicals. Among these substituents are —CN, —COR and CO$_2$R, where in each case R is an alkyl or aryl residue or aryl and/or heteroaryl group.

Alkyl residues are saturated or unsaturated, branched or linear hydrocarbon residues with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl residues are cyclic aromatic residues that have 6 to 14 carbon atoms in the aromatic ring. These residues can be substituted. Substituents are, for example, linear and branched alkyl groups with 1 to 6 carbon atoms such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups and halides.

Among the aromatic residues are, for example, phenyl, xylyl, toluyl, naphthyl or biphenylyl.

The term "heteroaryl" identifies a heteroaromatic ring system, where at least one CH group is replaced by N or two neighboring CH groups by S, O or NH, such as a residue of thiophene, furan, pyrrole, thiazole, oxazole, pyridine, pyrimidine and benzo[a]furan, which likewise can have the previously mentioned substituents.

An initiator that can be used in accordance with the invention can be any compound that has one or more atoms or atomic groups that are radically transferable under the polymerization conditions.

Suitable initiators include those of the formulas:

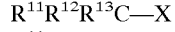
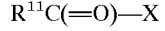

$R^{11}R^{12}R^{13}Si—X$
$R^{11}R^{12}N—X$
$R^{11}N—X_2$
$(R^{11})_nP(O)_m—X_{3-n}$
$(R^{11}O)_nP(O)_m—X_{3-n}$ and
$(R^{11})(R^{12}O)P(O)_m—X$,
where X is selected from the group consisting of Cl, Br, I, $OR^{10}$, [where $R^{10}$ is an alkyl group with 1 to 20 carbon atoms, where each hydrogen atom can independently be replaced by a halide, preferably chloride or fluoride, an alkenyl with 2 to 20 carbon atoms, preferably vinyl, an alkynyl with 2 to 10 carbon atoms, preferably acetylenyl or phenyl, which can be substituted with 1 to 5 halogen atoms or alkyl groups with 1 to 4 carbon atoms, or aralkyl (aryl-substituted alkyl in which the aryl group is phenyl or substituted phenyl and the alkyl group is an alkyl with 1 to 6 carbon atoms, such as benzyl, for example)], $SR^{14}$, $SeR^{14}$, $OC(=O)R^{14}$, $OP(=O)R^{14}$, $OP(=O)(OR^{14})_2$, $OP(=O)OR^{14}$, $O—N(R^{14})_2$, $S—C(=S)N(R^{14})_2$, CN, NC, SCN, CNS, OCN, CNO and $N_3$, where $R^{14}$ means an alkyl group or a linear or branched alkyl group with 1 to 20, preferably 1 to 10 carbon atoms, where two $R^{14}$ groups, is present, together can form a 5, 6 or 7-member heterocyclic ring; and $R^{11}$, $R^{12}$ and $R^{13}$ are independently chosen from the group consisting of hydrogen, halogens, alkyl groups with 1 to 20, preferably 1 to 10 and especially preferably 1 to 6 carbon atoms, cycloalkyl groups with 3 to 8 carbon atoms, $R^{8*}_3Si$, $C(=Y^*)R^{5*}$, $C(=Y^*)NR^{6*}R^{7*}$, where $Y^*$, $R^{5*}$, $R^{6*}$ and $R^{7*}$ are defined as above, COCl, OH, (preferably one of the residues $R^{11}$, $R^{12}$ and $R^{13}$ is OH), CN, alkenyl or alkynyl groups with 2 to 20 carbon atoms, preferably 2 to 6 carbon atoms and especially preferably allyl or vinyl, oxiranyl, glycidyl, alkylene or alkenylene groups with 2 to 6 carbon atoms, which are substituted with oxiranyl or glycidyl, aryl, heterocyclyl, aralkyl, aralkenyl (aryl-substituted alkenyl, where aryl is defined as above and alkenyl is vinyl, which is substituted with one or two $C_1$ to $C_6$ alkyl groups and/or halogen atoms, preferably with chlorine), alkyl groups with 1 to 6 carbon atoms, in which one up to all of the hydrogen atoms, preferably one, is/are substituted by halogen (preferably fluorine or chlorine, if one or more hydrogen atoms are replaced, and preferably fluorine, chlorine or bromine, if one hydrogen atom is replaced), alkyl groups with 1 to 6 carbon atoms, which with 1 to 3 substituents (preferably 1) are chosen from the group consisting of $C_1$-$C_4$ alkoxy, aryl, heterocyclyl, $C(=Y^*)R^{5*}$, (where $R^{5*}$ is defined as above), $C(=Y^*)NR^{6*}R^{7*}$ (where $R^{6*}$ and $R^{7*}$ are defined as above), oxiranyl and glycidyl (preferably not more than 2 of the residues $R^{11}$, $R^{12}$ and $R^{13}$ are hydrogen, especially preferably a maximum of one of the residues $R^{11}$, $R^{12}$ and $R^{13}$ is hydrogen);

m is 0 or 1; and m=0, 1 or 2 [sic].

Among the especially preferred initiators are benzyl halides like p-chloromethylstyrene, α-dichloroxylene, α,α-diochloroxylene, α,α-dibromoxylene and hexakis (α-bromomethyl)benzene, benzyl chloride, benzyl bromide, 1-bromo-1-phenylethane and 1-chloro-1-phenylethane; carboxylic acids derivatives that are halogenated in α position, such as propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides like tetrachloromethane, tribromomethane, 1-vinylethyl chloride, 1-vinylethyl bromide; and halogen derivatives of phosphoric acid esters like dimethylphosphoric chloride.

The initiator is in general used in a concentration in the range of $10^{-4}$ mol/L to 3 mol/L, preferably in the range of $10^{-3}$ mol/L to $10^{-1}$ mol/L and especially preferably in the range of $5\times10^{-2}$ mol/L to $5\times10^{-1}$ mol/L, without any limitation intended by this. The molecular weight of the polymer results from the ratio of initiator to monomer, if all of the monomer is converted. Preferably this ratio lies in the range of $10^{-4}$ to 1 up to 0.5 to 1, especially preferably in the range of $5\times10^{-3}$ to 1 up to $5\times10^{-2}$ to 1.

Catalysts that contain at least one transition metal are used to conduct the polymerization. Here any transition metal compound that can produce a redox cycle with the initiator or the polymer chain that has a transferable atomic group can be used. In these cycles the transferable atomic group and the catalyst reversibly form a compound, with the degree of oxidation of the transition metal being increased or decreased. Here one assumes that radicals are released or trapped, so that the concentration of radicals stays very low. However, it is also possible that the insertion of ethylenically unsaturated monomers into the Y—X or $Y(M)_z$—X bond will be enabled or facilitated by the addition of the transition metal compound to the transferable atomic group, where Y and X have the meaning given above and M means the monomer, while z represents the degree of polymerization.

Preferred transition metals here are Cu, Fe, Co, Cr, Ne, Sm, Mn, Mo, Ag, Zn, Pd, Pt, Re, Rh, Ir, In, Yd, and/or Ru, which are used in appropriate degrees of oxidation. These metals can be used individually and as mixtures. It is assumed that these metals catalyze the redox cycles of the polymerization, with the redox pairs $Cu^+/Cu^{2+}$ or $Fe^{2+}/Fe^{3+}$, for example, being active. Accordingly, the metal compounds are added to the reaction mixture as halides such as chloride or bromide, as alkoxide, hydroxide, oxide, sulfate, phosphate or hexafluorophosphate or trifluoromethane sulfate. Among the preferred metallic compounds are $Cu^2O$, CuBr, CuCl, CuI, $CuN_3$, CuSCN, CuCN, $CuNO_2$, $CuNO_3$, $CuBF_4$, $Cu(CH_3COO)$ $Cu(CF_3COO)$, $FeBr_2$, $RuBr_2$, $CrCl_2$ and $NiBr_2$.

However, compounds in higher oxidation states can also be used, for example CuO, $CuBr_2$, $CuCl_2$, $CrCl_3$, $Fe_2O_3$, and $FeBr_3$. In these cases the reaction can be initiated with the aid of classical radical formers such as AIBN. Here the transition metal compounds are reduced at first, since they are reacted with the radicals generated from the classical radical formers. This is the reverse ATRP, as was described by Wang and Matyjaszewski in Macromolecules (1995) Vol. 28, pp. 7572–7573.

Moreover, the transition metals can be used for catalysis as metal in the zero oxidation state, especially in mixture with the previously mentioned compounds, as is indicated, for example, in WO 98/40415. In these cases the reaction rate of the conversion can be increased. One assumes that in this way the concentration of catalytically active transition metal compound is increased by comproportionating transition metals in a high oxidation state with metallic transition metal.

The molar ratio of transition metal to initiator lies in general in the range of 0.0001:1 to 10:1, preferably in the range of 0.001:1 to 5:1 and especially preferably in the range of 0.01:1 to 2:1, without this intending to imply any limitation.

The polymerization takes place in the presence of ligands that can form a coordination compound with the metallic catalyst(s). These ligands serve, among other things, to increase the solubility of the transition metal compound. Another important function of the ligands is that the formation of stable organometallic compounds is avoided. This is particularly important, since these stable compounds would not polymerize under the selected reaction conditions. In addition, it is assumed that the ligands facilitate the abstraction of the transferable atomic group.

These ligands are substantially known and are described, for example, in WO 97/18247 and WO 98/40415. These compounds in general have one or more nitrogen, oxygen, phosphorus and/or sulfur atoms, via which the metal atom can be bonded. Many of these ligands can in general be represented by the formula $R^{16}$—Z—$(R^{18}$—Z$)_m$—$R^{17}$, where $R^{16}$ and $R^{17}$ independently mean H, $C_1$ to $C_{20}$ alkyl, aryl, heterocyclyl, which can optionally be substituted. These substituents include, among others, alkoxy residues and the alkylamino residues. $R^{16}$ and $R^{17}$ can optionally form a saturated, unsaturated or heterocyclic ring. Z means O, S, NH, $NR^{19}$, or $PR^{19}$, where $R^{19}$ has the same meaning as $R^{16}$. $R^{18}$ means, independently, a divalent group with 1 to 40 C atoms, preferably 2 to 4 C atoms, which can be linear, branched or cyclic, such as a methylene, ethylene, propylene or butylene group. The meanings of alkyl and aryl were given above. Heterocyclyl residues are cyclic residues with 4 to 12 carbon atoms, in which one or more of the $CH_2$ groups of the ring has been replaced by heteroatom groups like O, S, NH and/or NR, where the residue R has the same meaning as $R^{16}$.

Another group of suitable ligands can be represented by the formula

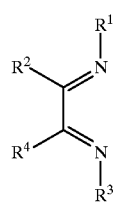

(IV)

where $R^1$, $R^2$, $R^3$ and $R^4$ independently mean H, $C_1$–$C_{20}$ alkyl, aryl, heterocyclyl and/or heteroaryl residues, where the residues $R^1$ and $R^2$ or $R^3$ and $R^4$ together can form a saturated or unsaturated ring.

Preferred ligands here are chelate ligands that contain N atoms.

Among the preferred ligands are triphenylphosphane, 2,2-bipyridine, alkyl-2,2-bipyridine like 4,4-di-(5-nonyl)-2, 2-bipyridine, 4,4-di-(5-heptyl)-2,2 bipyridine, tris(2-aminoethyl)amine (TREN), N,N,N',N',N"-pentamethyldiethylenetriamine, 1,1,4,7,10,10-hexamethyltriethylenetetraamine and/or tetramethylethylenediamine. Other preferred ligands are described, for example, in WO 97/47661. The ligands can be used individually or as a mixture.

These ligands can form coordination compounds in situ with the metal compounds or they can be prepared initially as coordination compounds and then added to the reaction mixture.

The ratio of ligand to transition metal is dependent upon the dentation of the ligand and the coordination number of the transition metal. In general the molar ratio is in the range of 100:1 to 0.1:1, preferably 6:1 to 0.1:1 and especially preferably 3:1 to 0.5:1, without this intending to imply any limitation.

The monomers, the transition metal catalysts, the ligands and the initiators are chosen in each case accordirig to the desired polymer solution. It is assumed that a high rate constant for the reaction between the transition metal- ligand complex and the transferable atomic group is important for a narrow molecular weight distribution. If the rate constant of this reaction is too low, the concentration of radicals will be too high, so that the typical termination reactions that are responsible for a broad molecular weight distribution will occur. The exchange rate is, for example, dependent on the transferable atomic group, the transition metal, the ligands and the anion of the transition metal compound. The specialist will find valuable advice for choosing these components in WO 98/40415, for example.

The polymerization can be carried out at normal pressure, reduced pressure or elevated pressure. The polymerization temperature is also not critical. However, in general it lies in the range of –20–200° C., preferably 0–130° C. and especially preferably 60–120° C., without limitation intended by this.

The polymerization can be carried out with or without solvents. The term solvent is to be broadly understood here.

Preferably the polymerization is carried out in a nonpolar solvent. Among these solvents are hydrocarbon solvents such as aromatic solvents like toluene, benzene and xylene, saturated hydrocarbons such as cyclohexane, heptane, octane, nonane, decane, dodecane, which can also occur in branched form. These solvents can be used individually and as a mixture. Especially preferred solvents are mineral oils and synthetic oils and mixtures of these. Of these, mineral oils are really especially preferred.

Mineral oils are substantially known and commercially available. They are in general obtained from petroleum or crude oil by distillation and/or refining and optionally additional purification and processing methods, especially the higher-boiling fractions of crude oil or petroleum fall under the concept of mineral oil. In general, the boiling point of the mineral oil is higher than 200° C., preferably higher than 300° C., at 5000 Pa. Preparation by low temperature distillation of shale oil, coking of hard coal, distillation of lignite under exclusion of air as well as hydrogenation of hard coal or lignite is likewise possible. To a small extent mineral oils are also produced from raw materials of plant origin (for example jojoba, rapeseed oil) or animal origin (for example neatsfoot oil). Accordingly, mineral oils exhibit different amounts of aromatic, cyclic, branched and linear hydrocarbons, in each case according to origin.

In general, one distinguishes paraffin-base naphthenic and aromatic fractions in crude oil or mineral oil, where the term paraffin-base fraction stands for longer-chain or highly branched isoalkanes and naphthenic fraction stands for cycloalkanes. Moreover, mineral oils, in each case according to origin and processing, exhibit different fractions of n-alkanes, isoalkanes with a low degree of branching, so called monomethyl-branched paraffins, and compounds with heteroatoms, especially O, N and/or S, to which polar properties are attributed. The fraction of n-alkanes in the preferred mineral oils is less than 3% by weight, the fraction of O, N and/or S-containing compounds is less than 6% by weight. The fraction of aromatic compounds and monomethyl-branched paraffins is in general in each case in the range of 0 to 30% by weight. In accordance with one interesting aspect, mineral oil comprises mainly naphthenic and paraffin-base alkanes, which in general have more than 13, preferably more than 18 and really especially preferably more than 20 carbon atoms. The fraction of these compounds is in general ≧60% by weight, preferably ≧80% by weight, without any limitation intended by this.

An analysis of especially preferred mineral oils, which was done with traditional methods such as urea dewaxing and liquid chromatography on silica gel, shows, for example, the following components, where the percentages refer to the total weight of the relevant mineral oil:

n-alkanes with about 18 to 31 C atoms:
0.7–1.0%,
low-branched alkanes with 18 to 31 C atoms:
1.0–8.0%,
aromatic compounds with 14 to 32 C atoms:
0.4–10.7%,
iso- and cycloalkanes with 20 to 32 C atoms:
60.7–82.4%,
polar compounds:
0.1–0.8%,
loss:
6.9–19.4%.

Valuable advice regarding the analysis of mineral oil as well as a list of mineral oils that have other compositions can be found, for example, in Ullmann's Encyclopedia of Industrial Chemistry, 5$^{th}$ Edition on CD-ROM, 1997, under the entry "lubricants and related products."

Synthetic oils are, among other substances, organic esters, organic ethers like silicone oils and synthetic hydrocarbons, especially polyolefins. They are for the most part somewhat more expensive than the mineral oils, but they have advantages with regard to performance. For an explanation one should refer to the 5 API classes of base oil types (API: American Petroleum Institute), and these base oils can especially preferably be used as solvents.

These solvents can be used, among other ways, in an amount of 1 to 99% by weight, preferably 5 to 95% by weight, especially preferably 5 to 60% by weight and really especially preferably 10 to 50% by weight, with respect to the total weight of the mixture, without any limitation intended to be implied by this.

The polymers prepared in this way in general have a molecular weight in the range of 1,000 to 1,000,000 g/mol, preferably in the range of range of $10 \times 10^3$ to $500 \times 10^3$ g/mol and especially preferably in the range of $20 \times 10^3$ to $300 \times 10^3$ g/mol, without any limitation intended by this. These values refer to the weight average molecular weight of the polydisperse polymers in the composition.

The particular advantage of ATRP compared to the traditional radical polymerization methods lies in the fact that polymers with narrow molecular weight distribution can be made. Without intending any limitation by this, polymers that were produced by the method in accordance with the invention exhibit a polydispersity, given by $M_w/M_n$, in the range of 1 to 12, preferably 1 to 4.5, especially preferably 1 to 3, and really especially preferably 1.05 to 2.

The copolymers in accordance with the invention find use, among other things, as additives to lubricant oils and diesel biofuels to reduce the pour point. Thus, other interesting aspects of this invention are lubricants and diesel biofuels that contain copolymers in accordance with the invention.

The copolymers in accordance with the invention can be used individually or as a mixture, where the term mixture is to be understood broadly. It includes both mixtures of different copolymers of this invention as well as mixtures of copolymers in accordance with the invention with traditional polymers.

Diesel biofuels are substantially known and designate natural, especially renewable oils, which are suitable for operation of specially adapted diesel engines. These diesel fuels include, for example, plant oils such as rapeseed oil.

Examples of lubricants are, among other things, motor oils, machine oils, turbine oils, hydraulic fluids, pump oils, heat transfer oils, insulation oils, cutting fluids and cylinder oils.

These lubricants contain in general a base oil and one or more additives, which are to a large extent known among specialists.

In principle any compound is suitable as a base oil that provides a sufficient lubricant film that does not breakdown even at elevated temperatures. The viscosities, for example, can serve to determine this property, as they are established, for example, for motor oils in the SAE specifications.

Compounds that are suitable for this are, among others, natural oils, mineral oils and synthetic oils, as well as mixtures of these.

Natural oils are animal or vegetable oils such as neatsfoot oil or jojoba oils. Mineral oils have been extensively described as solvents previously. They are particularly advantageous because of their favorable price. Synthetic oils are, among others, organic esters, synthetic hydrocarbons, especially polyolefins, which meets the requirements even earlier. They are for the most part more expensive than the mineral oils, but they have advantages with regard to their performance.

These base oils can also be used as mixtures and are widely commercially available.

The copolymers in accordance with the invention can also be used as a component of the so called DI packets (detergent inhibitor) or other concentrates that are added to lubricants and that are largely known. These concentrates include 15 to 85% by weight of one or more copolymers of this invention. In addition, the concentrate can additionally contain organic solvents, especially a mineral oil and/or a synthetic oil.

Lubricant oils or the aforementioned concentrates in general contain additives as well as the base oil. Among these additives are viscosity index improvers, antioxidants, anti-aging agents, corrosion inhibitors, detergents, dispersants, EP additives, foam inhibitors, friction reducing agents, pour point depressants, dyes, odorants and/or de-emulsifiers.

The additives bring about favorable flow behavior and low and high temperatures (improvement of viscosity index), they suspend solids (detergent-dispersant behavior), they neutralize acid reaction product and form a protective film on the cylinder surface (EP additives, EP for "extreme pressure"). The specialist will find additional valuable advice in Ullmann's Encyclopedia of Industrial Chemistry, Fifth Edition on CD-ROM, 1998.

The quantities in which these additives are used are dependent on the area of use of the lubricant. In general, the amount of the base oil is, however, between 25 and 90% by weight, preferably 50 to 75% by weight. The amount of copolymers of this invention in lubricant-oils is preferably in the range of 0.01 to 10% by weight, especially preferably 0.01 to 2% by weight. Diesel biofuels contain the polymers of this invention preferably in an amount in the range of 0.01 to 10% by weight, especially 0.01 to 2% by weight.

The invention is illustrated in more detail below by examples and comparison examples, without there be any intention to limit the invention to these examples.

SYNTHESIS EXAMPLES

The ATRP polymerization experiments were carried out in a round bottom flask, which was outfitted with a saber stirrer, heating mantle, nitrogen inlet and rapid cooling system. The monomer mixture given in Table 1 was put into the vessel together with 50 g mineral oil (Petro Co., Canada) or 50 g toluene and inertized by the additive of dry ice and supply of nitrogen.

Then the mixture was heated to 95° C with stirring. During the stirring operation 0.32 g CuBr and 0.77 g PMDETA (pentamethyldiethylenetriamine) was added at about 70° C. After the preestablished temperature of 95° C. was reached, 0.43 g EBiB (ethyl 2-bromoisobutyrate) was added.

After a reaction time of about 6 h at about 95° C. the mixture was cooled to room temperature, diluted with about 400 mL toluene and filtered through 10 g $Al_2O_3$ in order to separate contaminants. Then the toluene was distilled out on a rotary evaporator. The mixture was analyzed by GPC.

In Table 1:

CEMA means a mixture of long-chain methacrylates that was obtained from the reaction of methyl methacrylate with ®Nafol 1620 (Condea); LMA means a mixture of long-chain methacrylates that was obtained from the reaction of methyl methacrylate with ®Lorol (Henkel KGaA); SMA means a mixture of long-chain methacrylates that was obtained from the reaction of methyl methacrylate with ®Dehydad (Henkel KGaA); DPMA means a mixture of long-chain methacrylates that was obtained from the reaction of methyl methacrylate with ®Dobanol 25 L (Shell AG). In these reactions the methanol that was produced was separated.

The amounts of the components that used in each case as well as the polymerization results that were obtained are represented in Table 1 as the number average molecular weight M, and polydispersity PDI ($=M_w/M_n$) of the resulting polymers.

TABLE 1

| | Composition of monomers | Solvent | Mn | PDI |
|---|---|---|---|---|
| Example 1 | CEMA/LMA = 45/55 Total 200 g | Toluene | 92900 | 2.01 |
| Example 2 | CEMA/LMA = 45/55 Total 400 g | Mineral oil | 180000 | 4.02 |
| Example 3 | CEMA/LMA = 45/55 Total 200 g | Mineral oil | 80300 | 1.98 |
| Example 4 | CEMA/LMA = 45/55 Total 200 g | Mineral oil | 54000 | 1.62 |
| Example 5 | CEMA/LMA = 25/75 Total 200 g | Mineral oil | 81200 | 1.49 |
| Example 6 | SMA/DPMA = 22/78 Total 200 g | Mineral oil | 86600 | 1.51 |

Synthesis in the comparison examples followed U.S. Pat No. 5,368,761, where the amounts of the components in each case and the polymerization results that were obtained are presented in Table 2 as the number average molecular weight $M_n$ and the polydispersity PDI ($=M_w/M_n$) of the resulting polymers.

TABLE 2

| | Composition of monomers | Solvent | Mn | PDI |
|---|---|---|---|---|
| Comparison example 1 | CEMA/LMA = 45/55 Total 200 g | toluene | 46100 | 2.11 |
| Comparison example 2 | CEMA/LMA = 25/75 Total 200 g | Mineral oil | 79400 | 4.13 |
| Comparison example 3 | SMA/DPMA = 22/78 total 200 g | Mineral oil | 45000 | 1.96 |

APPLICATION EXAMPLES

In the following experiments the pour points were determined in accordance with ASTM D 97-93, the MRV value in accordance with ASTM 4684-92 and the scanning Brookfield results in accordance with ASTM D-5133-90. The gelation index is the maximum of the first mathematical derivative of the viscosity-temperature diagram of the scanning Brookfield measurement. With regard to the yield-stress value of the MRV measurement it should be taken into account that the measured values less than 35 Pa are given the value 0 because of the measurement precision.

The polymers obtained by the above syntheses were tested for their effectiveness as pour point depressants. For this a mixture of the amount of the relevant polymer given in Table 3 with 15W-40 (SAE) mineral oil (Farmland Co.) (Examples 1–4) or a recycled 15W-40 (SAE) (Farmland Co.) (Examples 5 and 6) was prepared and tested by the methods given results are also summarized in Table 3.

TABLE 3

| Polymer in accordance with | Polymer content (% by weight) | Pour Point | Viscosity [Pa*s] | Yield Stress [Pa] |
|---|---|---|---|---|
| example 1 | 0.03 | −33 | 13.5 | 0 |
| Comparison example 1 | 0.03 | −27 | 143.7 | 105 |
| example 2 | 0.06 | −30 | 14.5 | 0 |
| example 3 | 0.06 | −33 | 13.5 | 0 |
| example 4 | 0.06 | −33 | 14.6 | 0 |
| Comparison example 1 | 0.06 | −33 | 54.3 | 70 |
| example 5 | 0.04 | −36 | 34.9 | 0 |
| Comparison example 2 | 0.04 | −36 | 66.4 | 35 |
| Comparison example 2 | 0.08 | −36 | 37.3 | 0 |
| example 6 | 0.08 | −36 | 20.8 | 0 |
| Comparison example 3 | 0.08 | −36 | 52.0 | 70 |

| Polymer in accordance with | Polymer content (% by weight) | Viscosity at −20° C. | Temperature at 30 Pa · sec (° C.) | Gelation index at ° C. |
|---|---|---|---|---|
| example 1 | 0.03 | 7100 | −29.3 | 4.7 at −32 |
| Comparison example 1 | 0.03 | 30200 | −20 | 18.5 at −15 |
| example 2 | 0.06 | 7200 | −28.5 | 6.1 at −11 |
| example 3 | 0.06 | 7400 | −29.3 | 4.4 at −31 |
| example 4 | 0.06 | 7500 | −28.7 | 4.8 at −18 |
| Comparison example 1 | 0.06 | 8400 | −28 | 6.1 at −16 |
| example 5 | 0.04 | 38000 | −18.3 | 13 at −13 |
| Comparison example 2 | 0.04 | fest | −17.1 | 15.1 at −12 |
| Comparison example 2 | 0.08 | 24100 | −21.8 | 9.1 at −13 |
| example 6 | 0.08 | 11400 | −26.6 | 4 at −20 |
| Comparison example 3 | 0.08 | 38100 | −18.1 | 13.1 at −12 |

What is claimed is:

1. Copolymers obtained by polymerizing unsaturated monomers by means of initiators that have transferable atomic group, and one or more catalysts that contain a transition metal, in the presence of ligands that can form a coordination compound with the metallic catalyst(s), or the mixture of the ethylenically unsaturated monomers consists of a) 0 to 40% by weight of one or more ethylenically unsaturated ester compounds of formula (I)

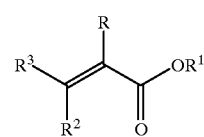

(I)

where R is hydrogen or methyl, $R^1$ means a linear or branched alkyl residue with 1 to 5 carbon atoms, $R^2$ and $R^3$ independently represent hydrogen or a group of the formula —COOR', where R' means hydrogen or an alkyl group with 1 to 5 carbon atoms, b) 10 to 98% by weight of one or more ethylenically unsaturated ester compounds of formula (II)

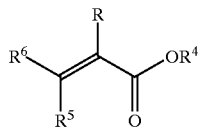
(II)

where R is hydrogen or methyl, $R^4$ means a linear branched alkyl residue with 6 to 15 carbon atoms, $R^5$ and $R^6$ independently are hydrogen or a group of the formula —COOR", where R" means hydrogen or an alkyl group with 6 to 15 carbon atoms, c) 0 to 80% by weight of one or more ethylenically unsaturated ester compounds of formula (III)

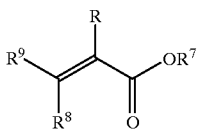
(III)

where R is hydrogen or methyl, $R^7$ means a linear or branched alkyl residue with 16 to 30 carbon atoms, $R^8$ and $R^9$ independently are hydrogen or a group of the formula —COOR''' where R''' means hydrogen or an alkyl group with 16 to 30 carbon atoms, d) 0 to 50% by weight comonomer, where the indication of % by weight in each case refers to the total weight of the ethylenically unsaturated monomers.

2. A copolymer as in claim 1 wherein the weight average molecular weight of the copolymer lies in the range of 10,000–500,000 g/mol.

3. A copolymer as in claim 1, wherein the polydispersity ($M_w/M_n$) lies in the range of 1 to 12.

4. A concentrate as lubricant oil additive, wherein the concentrate contains 15 to 85% by weight of one or more copolymers in accordance with claim 1.

5. A concentrate as in claim 4, wherein said concentrate further comprises organic solvents.

6. A lubricant oil containing copolymers as in claim 1.

7. A lubricant oil as in claim 6, wherein said copolymer is present in an amount in the range of 0.01 to 10% by weight.

8. A concentrate as in claim 4, or lubricant oil as in claim 6, further comprising an element selected from the group consisting of viscosity index improvers, antioxidants, corrosion inhibitors, detergents, dispersants, EP additives, foam inhibitors, friction reducers and/or deemulsifiers.

9. Diesel biofuels containing polymers as in claim 1.

10. Diesel biofuels as in claim 9, wherein said copolymer is present in an amount in the range of 0.01 to 10% by weight.

11. A method of improving the pour point depression and flow of a lubricant oil comprising adding the copolymer of claim 1 to a lubricant oil.

12. The copolymer of claim 3, wherein said copolymer has a polydispersity of 1.05 to 2.

13. The concentrate of claim 5 wherein said organic solvent is selected from the group consisting of a mineral oil, a synthetic oil and a mixture thereof.

14. The lubricant oil of claim 7, wherein said copolymer is present in an amount of 0.01 to 2% by weight.

15. The diesel biofuel of claim 10, wherein said copolymer is present in an amount of 0.01 to 2% by weight.

* * * * *